United States Patent
Li et al.

(10) Patent No.: US 7,303,374 B2
(45) Date of Patent: Dec. 4, 2007

(54) DISBOND RESISTANT COMPOSITE JOINT AND METHOD OF FORMING

(75) Inventors: Jian Li, Gilbert, AZ (US); Stephen L. Guymon, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 347 days.

(21) Appl. No.: 11/074,968

(22) Filed: Mar. 8, 2005

(65) Prior Publication Data

US 2006/0204364 A1 Sep. 14, 2006

(51) Int. Cl.
*F01D 17/18* (2006.01)

(52) U.S. Cl. .................. 416/61; 416/229 A; 29/889.6; 29/889.71

(58) Field of Classification Search ............ 416/229 A, 416/229 R, 230, 239, 241 A, 241 R; 156/64, 156/293, 304.1; 29/889.23, 889.6, 889.71
See application file for complete search history.

(56) References Cited

U.S. PATENT DOCUMENTS

| | | | |
|---|---|---|---|
| 4,120,610 A * | 10/1978 | Braswell et al. ............ | 416/226 |
| 4,648,800 A | 3/1987 | Fradenburgh et al. | |
| 5,440,193 A * | 8/1995 | Barrett ....................... | 310/328 |
| 5,820,344 A | 10/1998 | Hamilton et al. | |
| 6,544,366 B2 | 4/2003 | Hamilton et al. | |
| 6,565,942 B2 | 5/2003 | Anderson et al. | |

* cited by examiner

*Primary Examiner*—Edward K. Look
*Assistant Examiner*—Devin Hanan
(74) *Attorney, Agent, or Firm*—Senniger Powers

(57) ABSTRACT

A disbond resistant multi-laminate composite product is provided having, a first member; a second member of composite material bonded to the first member; a third member of composite material bonded to at least the second member and being so positioned and arranged such that when the second and third members are stressed at least a portion of the third member will have higher stress than the adjacent second member. The third member preferably has a terminal portion adjacent the second member in which terminal portion the strain energy release rate is higher than in the adjacent second member when the second and third members are stressed. The second and third members are preferably so positioned and arranged such that the third member initiates delamination from the second member before the second member initiates delamination from the first member when the first, second and third members are under stress. A stress level indicator is preferably associated with the third member to measure the stress levels in the third member.

21 Claims, 3 Drawing Sheets

DISBOND RESISTANT COMPOSITE JOINT AND METHOD OF FORMING

FIELD OF THE INVENTION

The present invention relates to bonded composite products and methods of forming such composite products.

BACKGROUND OF THE INVENTION

Multiple component composite products used in high stress environments can often delaminate due to the high stresses. Some of the causes for such delamination are different coefficients of expansion in multiple layers of material, including different types of materials, and different stress levels in adjacent layers of materials.

One example of where these differences in coefficients of expansion of adjacent materials and differences in stresses in adjacent layers of material can occur is in helicopter rotor systems. The blades, which are often formed of composite material, and supporting root fitting structures, which are often formed of metal, could produce high stresses in the area of the juncture between the blades and the root fittings. Such high stresses could cause delamination of the composite material adjacent the rotor at the connection between the root fittings and blades. These delaminations can occur because of the different coefficients of expansion of the metal and composite, differences in stresses at the juncture of the composite and metal, or both. Many factors are involved in reducing the overall stresses in this area and in reducing the differences in stresses among the components. These factors include the shapes of the parts in the area of the juncture and in the formation of the composite doublers that are part of the blade skin that attach to the root fittings. It would be advantageous to be able to modify such junctures to reduce the overall stresses in the composite and thus extend the useful life of such structures.

A further problem with such structures is that delaminations may occur beneath the surface of the composite material where it attaches to the root fittings and may not be detected in routine inspections. The ability to detect the eminent delamination could reduce the risk of deterioration of the rotor system.

Aside from the rotor system example, there are many applications of composite materials in combination with other composite materials, or other materials such as metals, where the prevention and/or detection of delamination would be desirable.

SUMMARY OF THE INVENTION

The present invention overcomes the above-described difficulties and disadvantages associated with prior art systems where high stresses and/or different coefficients of expansion in adjacent layers of material, including composite materials, produce delamination between these adjacent materials.

In a preferred embodiment of the present invention, a method of strengthening a composite joint is provided, comprising the steps of: providing a first member; providing a second member of composite material bonded to the first member; providing a third member of composite material bonded to at least the second member and being so positioned and arranged such that when the second and third members are stressed at least a portion of the third member will have higher stress than the adjacent second member. The third member is preferably provided with a terminal portion adjacent the second member in which terminal portion the strain energy release rate is higher than in the adjacent second member when the second and third members are stressed. In addition, the third member initiates delamination from the second member before the second member initiates delamination from the first member when the first, second and third members are under stress.

In a further preferred embodiment, a stress level indicator is placed on the third member to measure the stress levels in the third member. The indicator is monitored to determine stress levels. More preferably, the stress level indicator is placed on the third member adjacent the terminal portion thereof to monitor the stress levels in the third member adjacent the terminal portion to determine stress levels.

In a further preferred embodiment a bondline length between the second and third members is determined based on the third member material and length and the type of joint used to bond the third member to the second member such that failure will first occur in an outer edge of the third member before failure of the second member. The structure and arrangement of the members is determined using finite element methods and virtual crack closure technique in order to cause higher stresses in the third member when the second and third members are stressed. The third member is preferably provided with a terminal portion adjacent the second member in which terminal portion the strain energy release rate is higher than in the adjacent second member when the second and third members are stressed. A stress level indicator is preferably placed on the third member adjacent the terminal portion thereof to monitor the stress levels in the third member adjacent the terminal portion to determine stress levels.

In a further preferred embodiment of the present invention, a multi-laminate composite product is provided, comprising a first member; a second member of composite material bonded to the first member; a third member of composite material bonded to at least the second member and being so positioned and arranged such that when the second and third members are stressed at least a portion of the third member will have higher stress than the adjacent second member.

The third member preferably has a terminal portion adjacent the second member in which terminal portion the strain energy release rate is higher than in the adjacent second member when the second and third members are stressed. The second and third members are preferably so positioned and arranged such that the third member initiates delamination from the second member before the second member initiates delamination from the first member when the first, second and third members are under stress. A stress level indicator is preferably associated with the third member to measure the stress levels in the third member. A bondline between the second and third members preferably has a length based on the third member material and length and the type of joint used to bond the third member to the second member. The structure and arrangement of the members is preferably optimized by using finite element methods and virtual crack closure technique in order to cause higher stresses in the third member when the second and third members are stressed. The third member preferably has a terminal portion adjacent the second member in which terminal portion the strain energy release rate is higher than in the adjacent second member when the second and third members are stressed.

In a specific application, a preferred embodiment of the present invention is a helicopter rotor, comprising a root fitting; a blade including composite doublers bonding the blade to the root fitting; a composite material bonded to a portion of the root fitting and the composite doublers; the composite material being so positioned and arranged that the stresses in the composite material are higher than the stresses in adjacent portions of the composite doublers when both are stressed. The helicopter rotor also preferably includes a bondline between the root fitting and the composite material having a bondline length based on the composite material and length and the type of joint used to bond the composite material to the root fitting such that failure will first occur in an outer edge of the composite material before arrangement of the root fitting, composite doublers and composite material being optimized by using finite element methods and virtual crack closure technique in order to cause higher stresses in the composite material when the composite doublers and composite material are stressed. The helicopter rotor also preferably includes the composite material having a terminal portion adjacent the composite doublers in which terminal portion the strain energy release rate is higher than in the adjacent the composite doublers when the composite doublers and composite material are stressed.

BRIEF DESCRIPTION OF THE DRAWINGS

Figure 1:
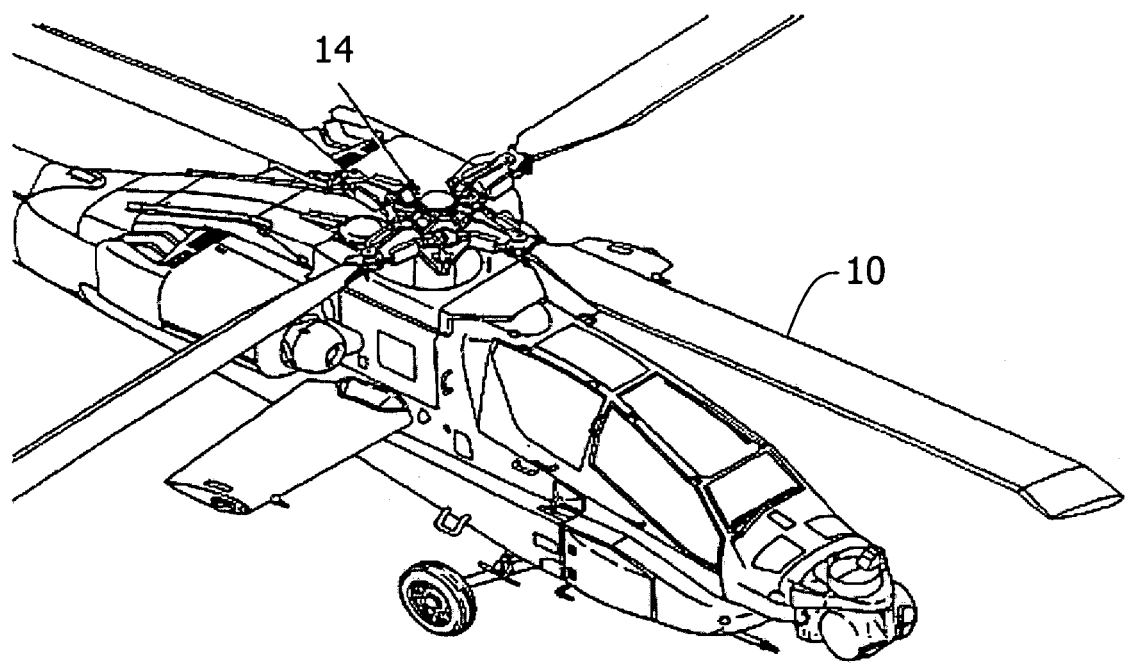
Figure 2:
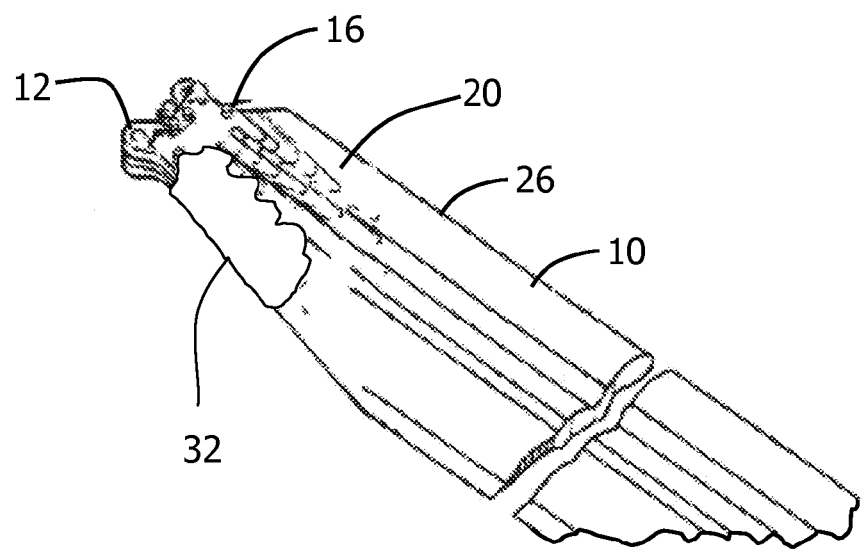
Figure 3:
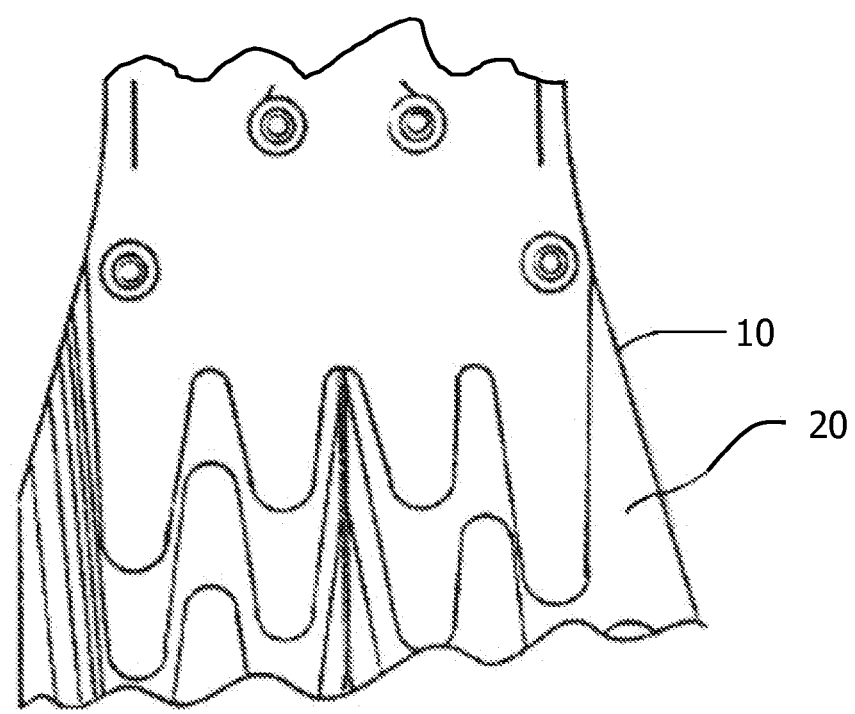
Figure 4:
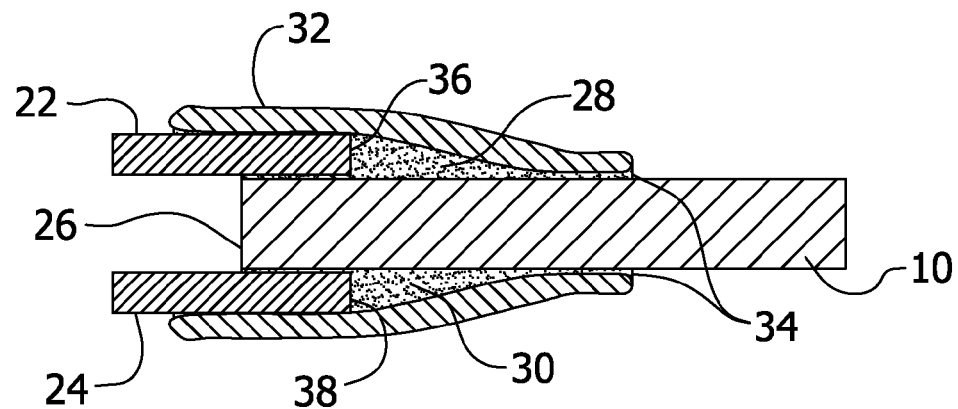

Having thus described the invention in general terms, reference will now be made to the drawings in which:

FIG. 1 is a perspective view of a helicopter on which blades and their support structure made in accordance with the present invention are mounted;

FIG. 2 is a perspective view of a portion of a blade, a root structure and a fragmentary portion of a cover made in accordance with the present invention;

FIG. 3 is a fragmentary plan view of a portion of the blade of FIG. 2;

FIG. 4 is a schematic cross-sectional view of the blade of FIG. 3; and

Figure 5:
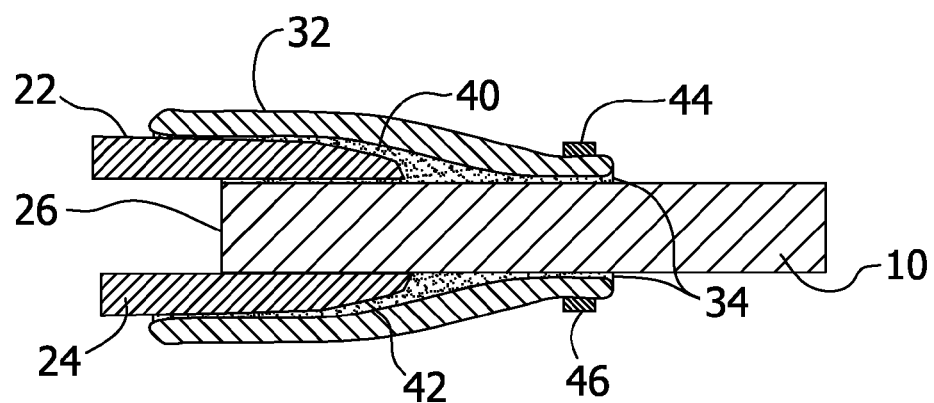

FIG. 5 is a view similar to FIG. 4 with a different construction of the prongs of the blade root.

DETAILED DESCRIPTION OF THE PREFERRED EMBODIMENT

To illustrate an example of an application of a joint made in accordance with the present invention and its method of formation, a helicopter rotor blade 10 is utilized as shown in FIG. 1. A portion of blade 10 is shown in FIGS. 2 and 3. In FIG. 2, a bracket 12 is shown which forms the end of the blade 10 which is used to attach blade 10 to the helicopter rotor 14, as shown in FIG. 1. The bracket 12 forms a part of the root structure 16 used to support the blade 10. The root structure 16 and bracket 12 are typically made of titanium for strength and lightness. As shown in FIGS. 2 and 3 the main portion of the rotor blade 10, which is formed of composite material, is attached to the blade root structure 16 by composite doublers 20 which lay between the root structure 16 and main blade portion of the blade 10 to secure them together. This connecting structure is shown schematically in FIGS. 4 and 5.

As shown in FIG. 4, the titanium root structure 16 is formed with two prongs 22 and 24 which receive the end 26 of main blade portion of the blade 10. Adhesive is applied in the areas 28 and 30 and a composite cover 32 is then applied over the ends of the root structure 16, adhesive in areas 28 and 30 and main blade portion of the blade 10. The outer bond line between the composite cover 32 and the composite doublers 20 on the main blade portion of the blade 10 is designed, considering both construction and materials, to insure failure at the cover's outer edge 34 before onset of a crack in the bond line between the composite doublers 20 and the root structure 16. The outer ends 36 and 38 of prongs 22 and 24, as shown in FIG. 4, are formed as butt ends. An alternative shape for butt ends 36 and 38 are shown in FIG. 5 where the prongs 22 and 24 are formed with tapered end portions 40 and 42. Various end structures for prongs 28 and 30 can be evaluated for use in such a construction through the use of finite element methods and virtual crack closure technique in order to cause higher strain energy release rate in the outer edge 34 than in the bond line between the cover 32 and prongs 22 and 24, and between the root end portion 26 of the blade 10 and prongs 22 and 24. These calculation techniques are set out in the publications attached hereto as appendices A and B, which include: "Three-Dimensional Effect in the Prediction of Flange Delamination in Composite Skin-Stringer Pull-off Specimens" by Jian Li, Journal of Composite Technology & Research, JCTRER, Vol. 24, No. 3, 2002, pp. 182-189, and "Flange Delamination Prediction in Composite structures with Ply Waviness", AIAA Journal, Vol. 38, No. 5, May 2000, pp. 893-897.

Also shown schematically in FIG. 5 are early warning devices 44 and 46. These devices can be utilized to indicate the level of stress at the outer edge 34 which can be monitored to indicate that delamination in this area is imminent. Such devices could include conventional strain gages, so called "smart materials" such as piezoelectric/piezoceramic materials or fiber optics to provide an early warning system.

The same system described above and the method of forming it for use in a helicopter rotor structure can be utilized in many other environments wherein the blade root structure is replace by a first member, the main blade portion is replaced by a second composite member and the cover is replaced by a third composite member. In addition, the third member need only contact the second member or both the second and first member. In addition, the members are so positioned and arranged such that when the second and third members are stressed at least a portion of the third member will have higher stress than the adjacent second member.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method of strengthening a composite joint, comprising the steps of:
   providing a first member;
   providing a second member of composite material bonded to the first member;
   providing a third member of composite material;
   applying the third member over an end of the first member and onto the second member, the third member being so positioned and arranged such that when the second and third members are stressed at least a portion of the third member will have higher stress than the adjacent second member.

2. The method of claim 1, including:
providing the third member with a terminal portion adjacent the second member in which terminal portion the strain energy release rate is higher than in the adjacent second member when the second and third members are stressed.

3. The method of claim 1, including:
the third member initiating delamination from the second member before the second member initiates delamination from the first member when the first, second and third members are under stress.

4. The method of claim 1, including:
placing a stress level indicator on the third member to measure the stress levels in the third member and monitoring the indicator to determine stress levels.

5. The method of claim 2, including:
placing a stress level indicator on the third member adjacent the terminal portion thereof to monitor the stress levels in the third member adjacent the terminal portion thereof and monitoring the indicator to determine stress levels.

6. A method of strengthening a composite joint, comprising the steps of:
providing a first member;
providing a second member of composite material bonded to the first member;
providing a third member of composite material bonded to at least the second member and being so positioned and arranged such that when the second and third members are stressed at least a portion of the third member will have higher stress than the adjacent second member;
determining a bondline length between the second and third members based on the third member material and length and the type of joint used to bond the third member to the second member such that failure will first occur in an outer edge of the third member before failure of a bond between the first member and the second member.

7. The method of claim 6, including:
optimizing the structure and arrangement of the members using finite element methods and virtual crack closure technique in order to cause higher stresses in the third member when the second and third members are stressed.

8. The method of claim 7 including:
providing the third member with a terminal portion adjacent the second member in which terminal portion the strain energy release rate is higher than in the adjacent second member when the second and third members are stressed.

9. The method of claim 8, including:
placing a stress level indicator on the third member adjacent the terminal portion thereof to monitor the stress levels in the third member adjacent the terminal portion thereof and monitoring the indicator to determine stress levels.

10. A multi-laminate composite product, comprising:
a first member;
a second member of composite material bonded to the first member;
a third member of composite material, the third member being disposed over an end of the first member and onto the second member, the third member being so positioned and arranged such that when the second and third members are stressed at least a portion of the third member will have higher stress than the adjacent second member.

11. The product of claim 10, including:
the third member having a terminal portion adjacent the second member in which terminal portion the strain energy release rate is higher than in the adjacent second member when the second and third members are stressed.

12. The product of claim 10, including:
the second and third members being so positioned and arranged such that the third member initiates delamination from the second member before the second member initiates delamination from the first member when the first, second and third members are under stress.

13. The product of claim 10, including:
a stress level indicator associated with the third member to measure the stress levels in the third member.

14. A multi-laminate composite product, comprising:
a first member;
a second member of composite material bonded to the first member;
a third member of composite material bonded to at least the second member and being so positioned and arranged such that when the second and third members are stressed at least a portion of the third member will have higher stress than the adjacent second member;
a bondline between the second and third members having a bondline length based on the third member material and length and the type of joint used to bond the third member to the second member such that failure will first occur in an outer edge of the third member before failure of a bond between the first member and the second member.

15. The product of claim 14, including:
the structure and arrangement of the members being optimized by using finite element methods and virtual crack closure technique in order to cause higher stresses in the third member when the second and third members are stressed.

16. The product of claim 15 including:
the third member having a terminal portion adjacent the second member in which terminal portion the strain energy release rate is higher than in the adjacent second member when the second and third members are stressed.

17. The product of claim 16, including:
a stress level indicator so positioned and arranged on the third member adjacent the terminal portion thereof to monitor the stress levels in the third member adjacent the terminal portion thereof and monitoring the indicator to determine stress levels.

18. A helicopter rotor, comprising:
a root fitting;
a blade including composite doublers bonding the blade to the root fitting;
a composite material bonded to a portion of the root fitting and the composite doublers;
the composite material being so positioned and arranged that the stresses in the composite material are higher than the stresses in adjacent portions of the composite doublers when both are stressed;

a bondline between the root fitting and the composite material having a bondline length based on the composite material and length and the type of joint used to bond the composite material to the root fitting such that failure will first occur in an outer edge of the composite material before failure of a bond between the composite doublers and the root fitting.

19. The helicopter rotor of claim 18, including:
the structure and arrangement of the root fitting, composite doublers and composite material being optimized by using finite element methods and virtual crack closure technique in order to cause higher stresses in the composite material when the composite doublers and composite material are stressed.

20. The helicopter rotor of claim 19 including:
the composite material having a terminal portion adjacent the composite doublers in which terminal portion the strain energy release rate is higher than in the adjacent the composite doublers when the composite doublers and composite material are stressed.

21. The helicopter rotor of claim 20, including:
a stress level indicator so positioned and arranged on the composite material adjacent the terminal portion thereof to monitor the stress levels in the composite material adjacent the terminal portion thereof and monitoring the indicator to determine stress levels.

* * * * *